(12) United States Patent
Belch et al.

(10) Patent No.: US 9,166,442 B1
(45) Date of Patent: Oct. 20, 2015

(54) ADAPTIVE INPUT CURRENT LIMITING FOR SWITCH-MODE CHARGERS

(71) Applicant: Maxim Integrated Products, Inc., San Jose, CA (US)

(72) Inventors: Mark A. Belch, Chandler, AZ (US); Kevin Dowdy, Phoenix, AZ (US); Sean Lai, Chandler, AZ (US); Brett Miwa, Wellesley, MA (US); David Harrington, Nashua, NH (US); David Stearns, Millbury, MA (US); Oscar Blyde, Melrose, MA (US); Rui Liu, Fremont, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 504 days.

(21) Appl. No.: 13/621,447

(22) Filed: Sep. 17, 2012

(51) Int. Cl.
*H02J 7/00* (2006.01)
*H02J 7/04* (2006.01)
*H01M 10/44* (2006.01)

(52) U.S. Cl.
CPC ................ *H02J 7/045* (2013.01); *H01M 10/44* (2013.01)

(58) Field of Classification Search
CPC ........... H01M 10/44; H02J 7/04; H02J 7/044; H02J 7/045; H02J 7/0055; H02J 7/007
See application file for complete search history.

(56) References Cited

U.S. PATENT DOCUMENTS

| | | | | |
|---|---|---|---|---|
| 2008/0258688 A1* | 10/2008 | Hussain et al. | ................ | 320/145 |
| 2009/0121684 A1* | 5/2009 | Hussain et al. | ................ | 320/139 |

* cited by examiner

*Primary Examiner* — Vuthe Siek
*Assistant Examiner* — Aric Lin (57) ABSTRACT

A system includes a voltage regulator module, a voltage comparator module, and a current limiting module. The voltage regulator module regulates an input voltage supplied by a power supply and supplies an output current to a load. The voltage comparator module compares the input voltage to a first threshold. The current limiting module decreases the output current when the input voltage decreases to less than or equal to the first threshold, decreases the output current until the input voltage increases to greater than the first threshold, and decreases the output current by an additional predetermined amount after the input voltage increases to greater than the first threshold.

17 Claims, 4 Drawing Sheets

ADAPTIVE INPUT CURRENT LIMITING FOR SWITCH-MODE CHARGERS

FIELD

The present disclosure relates generally to power supplies and more specifically to adaptive input current limiting.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Handheld devices such as smartphones, tablets, personal digital assistants (PDAs), and electronic books (e-Books) are typically powered by rechargeable batteries. The handheld devices include charging modules to charge the batteries. The charging modules use DC power received from a DC power supply to charge the batteries. AC adapters typically provide the DC power to the charging modules.

SUMMARY

A system includes a voltage regulator module, a voltage comparator module, and a current limiting module. The voltage regulator module regulates an input voltage supplied by a power supply and supplies an output current to a load. The voltage comparator module compares the input voltage to a first threshold. The current limiting module decreases the output current when the input voltage decreases to less than or equal to the first threshold, decreases the output current until the input voltage increases to greater than the first threshold, and decreases the output current by an additional predetermined amount after the input voltage increases to greater than the first threshold.

In other features, the power supply is a direct current (DC) power supply, the input voltage is DC voltage generated by the DC power supply, the load is a battery, the output current is a charging current of the battery, and the voltage regulator is a Buck regulator.

In other features, the current limiting module decreases the output current to a predetermined value when the input voltage decreases to less than or equal to a second threshold, where the second threshold is less than the first threshold.

In other features, the current limiting module comprises a counter and a digital to analog converter (DAC). The counter generates a first output based on the input voltage and the output current. The DAC converts the first output and generates a second output. The voltage regulator module supplies the output current to the load based on the second output.

In other features, the system further comprises a current sensing module that senses an input current drawn from the power supply by the voltage regulator module. The counter counts up when the output current supplied to the load is less than a predetermined value, the input voltage is greater than the first threshold, and the input current is less than a predetermined threshold.

In other features, the system further comprises a current sensing module that senses an input current drawn from the power supply by the voltage regulator module. The counter counts down when the input voltage is less than or equal to the first threshold and greater than a second threshold that is less than the first threshold or when the input current is greater than or equal to a predetermined threshold.

In other features, the counter counts down a plurality of counts when the input voltage is less than or equal to the first threshold and greater than the second threshold. The counter counts down a single additional count when the input current becomes greater than or equal to the predetermined threshold.

In other features, the system further comprises a timer that starts when the counter stops counting down. The current limiting module determines, after the timer expires, if the input voltage is less than or equal to the first threshold or if the input current is greater than or equal to the predetermined threshold.

In other features, the counter counts down at a faster rate than the counter counts up.

In still other features, a system comprises a voltage regulator module, a current sensing module, and a current limiting module. The voltage regulator module regulates an input voltage supplied by a power supply and supplies an output current to a load. The current sensing module senses an input current drawn from the power supply by the voltage regulator module. The current limiting module decreases the output current when the input current increases to greater than or equal to a predetermined threshold and decreases the output current until the input current decreases to less than the predetermined threshold.

In other features, the power supply is a direct current (DC) power supply, the input voltage is DC voltage generated by the DC power supply, the load is a battery, the output current is a charging current of the battery, and the voltage regulator is a Buck regulator.

In other features, the current limiting module comprises a counter and a digital to analog converter (DAC). The counter generates a first output based on the input voltage, the input current, and the output current. The DAC converts the first output and generates a second output. The voltage regulator module supplies the output current to the load based on the second output.

In other features, the system further comprises a voltage comparator module that compares the input voltage to a first threshold. The counter counts up when the output current supplied to the load is less than a predetermined value, the input voltage is greater than the first threshold, and when the input current is less than the predetermined threshold.

In other features, the system further comprises a voltage comparator module that compares the input voltage to a first threshold. The counter counts down when the input voltage is less than or equal to the first threshold and greater than a second threshold that is less than the first threshold or when the input current is greater than or equal to the predetermined threshold.

In other features, the counter counts down a plurality of counts when the input voltage is less than or equal to the first threshold and greater than the second threshold. The counter counts down a single additional count when the input current becomes greater than or equal to the predetermined threshold.

In other features, the system further comprises a timer that starts when the counter stops counting down. The current limiting module determines, after the timer expires, if the input voltage is less than or equal to the first threshold or if the input current is greater than or equal to the predetermined threshold.

In other features, the system further comprises a voltage comparator module that compares the input voltage to a first threshold and a second threshold that is less than the first threshold. The current limiting module decreases the output current to a predetermined value when the input voltage decreases to less than or equal to the second threshold.

In other features, the counter counts down at a faster rate than counting up.

In still other features, a method comprises supplying an input voltage from a power supply to a voltage regulator and supplying an output current from the voltage regulator to a load. The method further comprises sensing an input current drawn from the power supply. The method further comprises decreasing the output current when the input current is greater than or equal to a first predetermined value until the input current decreases to less than the first predetermined value. The method further comprises decreasing the output current by a first amount when the input voltage is less than or equal to a first threshold until the input voltage increases to greater than the first threshold and by a second amount after the input voltage is greater than the first threshold.

In other features, the method further comprises decreasing the output current to a second predetermined value when the input voltage is less than or equal to a second threshold that is less than the first threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present disclosure relates to systems and methods that limit an input current drawn from a power source when supplying an output current to a load. For example only, a system according to the present disclosure comprises a power supply, a charging module, and a battery. An input current drawn from the power supply when supplying a charging current to the battery is limited according to the principles of the present disclosure. The teachings of the present disclosure, however, can be applied to any system that draws current from a power source and supplies current to a load.

Figure 1:
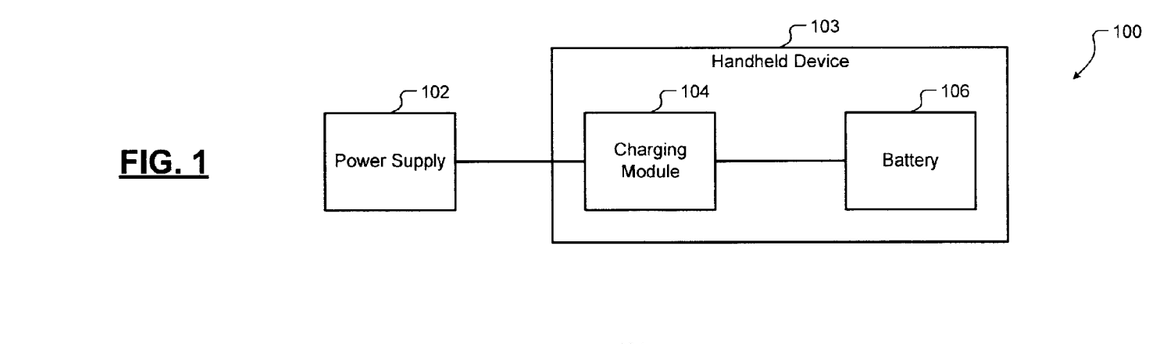
FIG. 1 is a functional block diagram of a system comprising a power supply that supplies power to charge a battery in a handheld device.

Referring now to FIG. 1, a system 100 includes a power supply 102 and a handheld device 103 comprising a charging module 104 and a battery 106. For example only, the power supply 102 may include an AC adapter that plugs into a wall outlet and that converts AC power to DC power suitable for the charging module 104. The power supply 102 may include other types of power supplies. For example, the power supply 102 may include a power supply that generates power based on alternative sources of energy (e.g., solar power), a wireless power supply (e.g., an inductive power supply), and so on.

The charging module 104 uses the DC power received from the power supply 102 to charge the battery 106. For example only, the charging module 104 may include a buck regulator to regulate the DC power received from the power supply 102. Other types of regulators may be used instead. For example, a boost regulator, a buck-boost regulator, and so on, may be used.

The charging module 104 draws an input current from the power supply 102 and supplies a charging current to the battery 106. A charging time of the battery 106 is a function of the charging current that can be supplied by the charging module 104. The charging current in turn depends on the input current that the power supply 102 can supply to the charging module 104.

Power supplies typically have different drive capabilities. When supplying the charging current to the battery 102, the input current drawn from the power supply 102 by the charging module 104 has to be limited to prevent pulling down the power supply 102. If the input current setting is not matched to the power supply drive capability, the power supply 102 can be overloaded or the charging time can be compromised.

The present disclosure relates to an adaptive current limiting system that adapts the input current limit to the power supply drive capability, which in turn prevents overloading the power supply while minimizing the charging time of the battery. More specifically, the system monitors the input voltage and reduces the input current when the input voltage drops below a set value. The input current is reduced further to allow the input voltage to recover. The input voltage supply capability of the power supply is retested periodically according to a programmable setting.

Some power supplies can supply an input current that is less than the charging current that a customer would desire to use to charge the battery. If the customer were to set the charging current to a higher value than the input current the power supply can supply, the input voltage supplied by the power supply to the charging module will fall to the battery voltage. When the input voltage falls, a buck regulator typically used in the charging module will operate in "dropout" mode, where the input and output are at the same voltage. When this occurs, the input current to the charging module and the charging current output by the charging module are also about the same. The input current to charging current ratio is approximately $V_{in}/V_{out}$ (i.e., the Buck ratio). Accordingly, for example, if the battery voltage is 3.6V and the input voltage is 12V, the charging current can increase approximately three-fold if the input voltage is allowed to go back up to 12V instead of the buck regulator running in the dropout mode.

The system according to the present disclosure measures the input voltage supplied by the power supply (e.g., the AC adapter) to the charging module. If the input voltage falls below a threshold, the system throttles back the charging current until the input voltage goes back above the threshold. The system throttles back the charging current further (e.g., 10% more) so that the input voltage can rise back to its initial voltage (especially if the power supply is a current source type power supply with high output impedance). This allows for higher charging current. The system also incorporates a current limit loop and a voltage limit as explained below. Further, the system is a digital system that isolates input voltage and current loops as explained below, which improves the design of the charging module.

Figure 2:
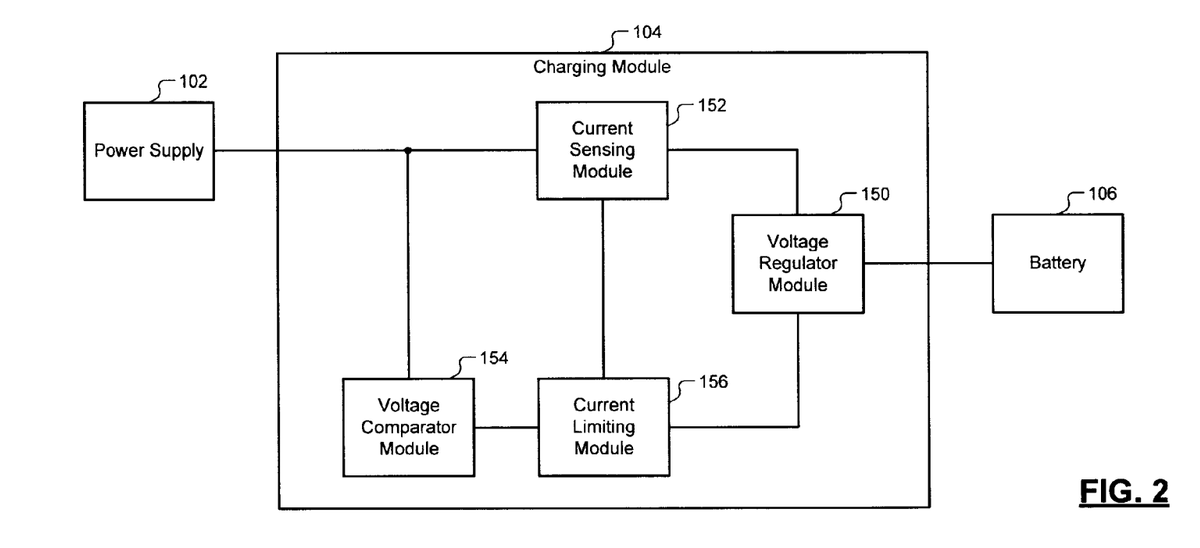
FIG. 2 is a functional block diagram of a charging module that charges the battery of the handheld device.

Referring now to FIG. 2, the system 100 is shown in detail. The charging module 104 includes a voltage regulator module 150, a current sensing module 152, a voltage comparator module 154, and a current limiting module 156. The voltage regulator module 150 regulates the input voltage supplied by the power supply 102 and supplies the output current to a load. For example, the voltage regulator module 150 supplies the charging current to the battery 106. The current sensing module 152 senses the input current drawn from the power supply 102 by the voltage regulator module 150 to supply the output current to the load. The voltage comparator module 154 compares the input voltage to a first threshold and a second threshold.

The current limiting module 156 decreases the output current when the input voltage decreases to less than the first threshold. The current limiting module 156 decreases the output current until the input voltage rises above the first threshold. The current limiting module 156 further decreases the input current drawn from the power supply 102 by a predetermined amount after the input voltage rises above the first threshold. The voltage comparator module 154 also compares the input voltage to the second threshold, which is below the first threshold. If the input voltage falls below the second threshold, the current limiting module 156 sets the output current to a predetermined minimum value.

Figure 3:
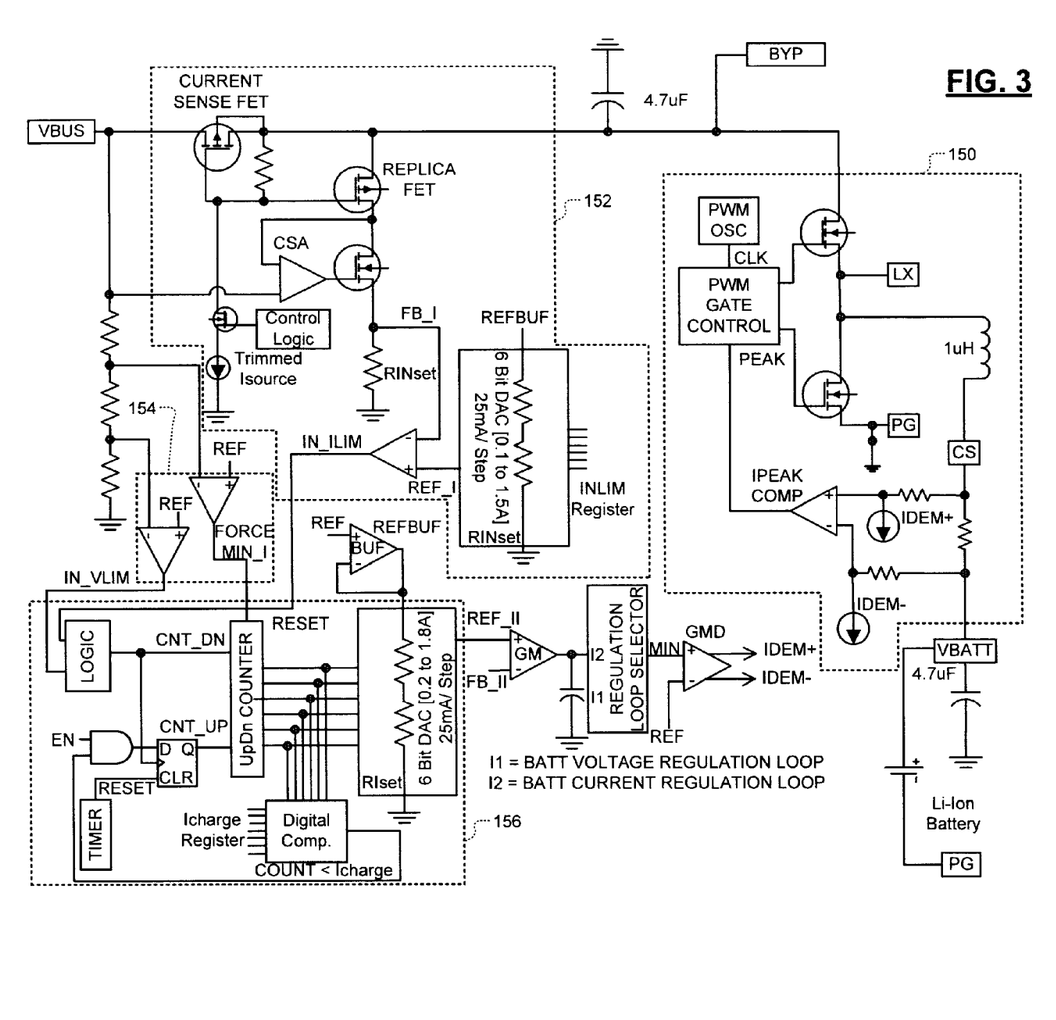
FIG. 3 is an example of a schematic of the charging module that charges the battery of the handheld device.

Referring now to FIG. 3, an example of the charging module 104 is shown in detail. The current sensing module 152 includes an example of a current sensing circuit that senses the input current drawn from the power supply (e.g., via a VBUS input of the charging module 104). The current sensing module 152 includes a DAC that converts a user-supplied input current limit to a reference REF_I. The current sensing module 152 compares the sensed input current to the reference REF_I and generates an output IN_ILIM when the sensed input current exceeds the input current limit REF_I as the charging current increases. The output IN_ILIM of the current sensing module 152 is input to the current limiting module 156.

The voltage comparator module 154 includes two comparators that compare the input voltage (i.e., the voltage supplied by the power supply 102 to the VBUS input of the charging module 104) to a first threshold and a second threshold. For example, a first comparator compares the input voltage to 4.5V, and a second comparator compares the input voltage to 4.4V. The first comparator generates an output IN_VLIM when the input voltage drops below the first threshold (e.g., 4.5V) as the charging current increases. The second comparator generates an output FORCE MIN_I when the input voltage drops below the second threshold (e.g., 4.4V) as the charging current increases. The outputs IN_V-LIM and FORCE MINI of the voltage comparator module 154 are input to the current limiting module 156.

When the output IN_VLIM of the voltage comparator module 154 is received by the current limiting module 156, a logic in the current limiting module 156 generates an output CNT_DN that causes an up/down counter in the current sensing module 152 to count down. A DAC in the current limiting module 156 converts an output of the up/down counter and generates an output REF_II that controls the voltage regulator module 150 and the charging current. The output REF_II reduces the charging current, which in turn reduces the input current drawn from the power supply 102. Reducing the input current allows the input voltage to the charging module 104 (i.e., the output voltage of the power supply 102) to rise.

When the input voltage rises above the first threshold (e.g., to 4.54V), the output IN_VLIM of the first comparator is deasserted. The logic in the current limiting module 156, however, causes the up/down counter to continue the countdown. The up/down counter counts down a predetermined number of additional codes (e.g., four more codes), which allows the input voltage to rise further. For example, the up/down counter continues to count down after the input voltage rises above a 4.58V threshold (80 mV of hysteresis). This allows the input voltage to rise further (e.g., all the way up to a rated value of the output voltage of the power supply 102) if the power supply 102 is a current source or a high-impedance source. This in turn allows the charging current to increase since a higher input voltage allows a higher output current.

In some instances, the input voltage may drop below the second threshold. At such times, the input voltage is not recovered by the counting down process. Instead, when the input voltage drops below the second threshold, the output FORCE MIN_I of the voltage comparator module 154 resets the up/down counter, which sets the charging current to a predetermined minimum value.

When the output IN_ILIM of the current sensing module 152 is received by the current limiting module 156, the logic in the current limiting module 156 generates the output CNT_DN that causes the up/down counter in the current limiting module 156 to count down. The DAC in the current limiting module 156 converts the output of the up/down counter and generates the output REF_II that reduces the charging current, which in turn reduces the input current drawn from the power supply 102. For example, the logic in the current limiting module 156 may cause the up/down counter to count down only one code since counting down a single code may be sufficient reduce the input current below REF_I. When the input current drops below REF_I, the output IN_ILIM of the current sensing module 152 is deasserted. The logic in the current limiting module 156 causes the up/down counter to stop counting down. Unlike in case of IN_VLIM, no additional counting down is performed. This helps keep the input current, and consequently the charging current, as high as possible.

Optionally, the logic in the current limiting module 156 may cause the up/down counter to count down with a faster clock, but count up with a normal clock. Counting down fast improves system response to input limits while counting up slowly in a softstart fashion reduces the possibility of oscillations.

The current limiting module 156 includes a timer. The timer starts when the CNT_DN signal is deasserted (i.e., when counting down has stopped). When the timer expires, the logic in the current limiting module 156 checks whether IN_ILIM or IN_VLIM is asserted (i.e., if the input current has exceeded REF_I or if the input voltage has dropped below the first threshold). The timer can be programmed to a suitable value and can be enabled or disabled. For example, the timer may be set to 16 ms to avoid audio interference that may be caused by piezoelectric effect of passive components (e.g., capacitors) used in the system.

The current limiting module 156 includes a digital comparator. A user can specify the charging current by programming an $I_{charge}$ register to a predetermined value of the charging current. The digital comparator compares the output of the up/down counter to the programmed value of the charging current. When IN_ILIM or IN_VLIM is not asserted (i.e., when the input current is less than REF_I and when the input voltage is greater than the first and second thresholds), the up/down counter stops counting when the count output by the up/down counter matches the programmed value of the charging current. Accordingly, when IN_ILIM or IN_VLIM is not asserted, the up/down counter counts up to the programmed value of the charging current, and the desired charging current is supplied to the battery 106.

The charging module 104 includes a regulation loop selector that selects either a battery voltage regulation loop or a battery current regulation loop based on REF_II and FB_II, where FB_II is a battery current sensed via a resistor between CS and VBAT terminals of the charging module 104. Alternatively, the battery current may be sensed using a circuit similar to the current sensing module 152. Other current sensing techniques may be used to sense the battery current and the input current. The regulation loop selector generates signals IDEM+ and IDEM−, which control the hysteretic Buck regulator shown to control the charging current. Circuits similar to the regulation loop selector may be used to control other voltage regulators.

The current limiting module 156 isolates the input current sensing and the input voltage sensing from the regulation loop selector and the voltage regulator. That is, the current limiting module 156 makes the input current sensing and the input voltage sensing independent of the voltage regulator used to charge the battery 106. Further, the current limiting module 156 allows any type of power supply to be used to supply power to the charging module 104. The voltage thresholds may be set differently depending on the type of power supply used. For example, if a solar powered power supply is used, the first and second thresholds may be set to different values than when an AC adapter is used.

Figure 4:
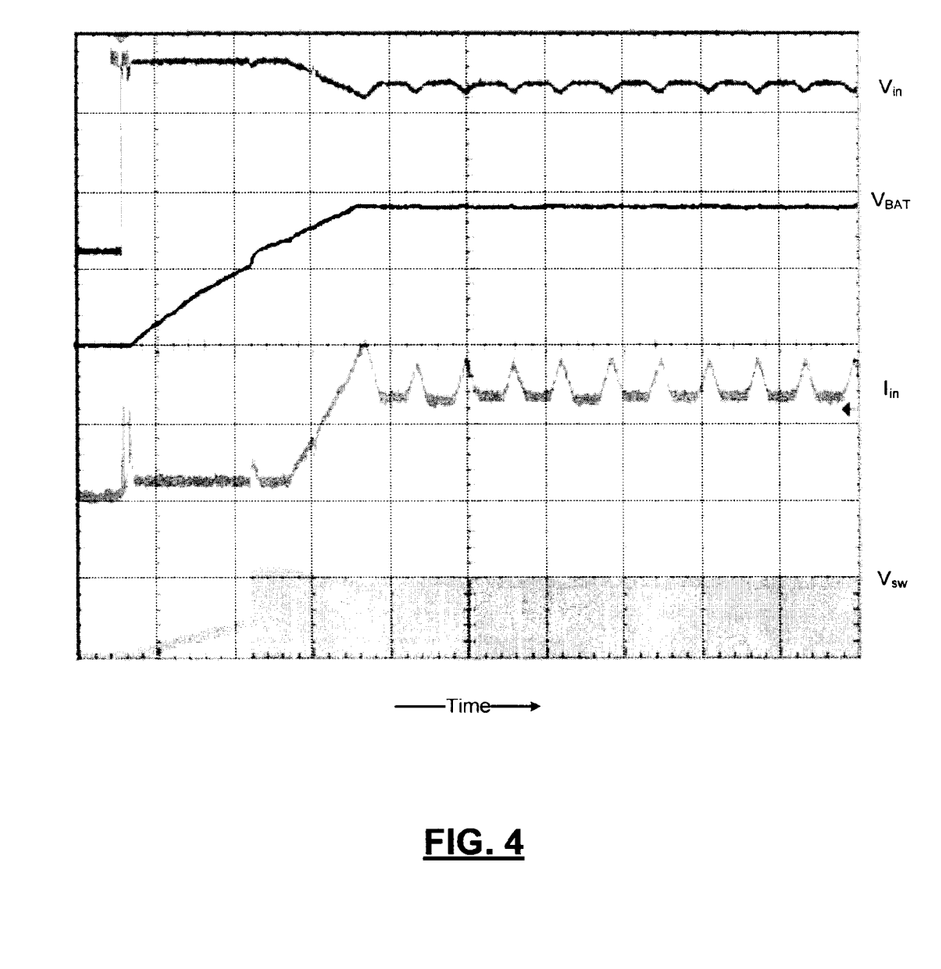
FIG. 4 depicts graphs of an input voltage of the power supply, a battery voltage, an input current drawn from the power supply, and a switching voltage of a voltage regulator as a function of time.

Referring now to FIG. 4, graphs of time versus the input voltage ($V_{in}$) of the power supply 102, the battery voltage ($V_{BAT}$) of the battery 106, the input current ($I_{in}$) of the power supply 102, and the switching voltage ($V_{sw}$) of the Buck regulator at node LX are shown. When the input is plugged in, the buck output increases to 3.6V and the input current increases until the input voltage droops below 4.50V. At that point, the up/down counter starts counting down, reducing the charging current until the input voltage goes above 4.54V. When that occurs, the up/down counter counts down four more LSB's, which equates to about 6.4% further decrease in the charging current. This helps the input voltage to rise even further. In case of a high impedance input, this will allow the input to go all the way back to its initial value. When this occurs, the buck ratio will allow a significantly higher charging current. When the countdown is complete, a 16 mS timer is started and the output is re-tested when the timer expires.

The first pulse is larger due to a delay. The delay is caused by a difference between the value of the input current programmed in an INLIM register, which is full scale, and the value of the charging current programmed in the $I_{charge}$ register, which is soft starting and therefore not at full scale yet. The difference between the two values causes the delay. If the charging current is close to its set point when the current limiting module 156 takes control, the delay will be small. If the charging current is well below its set point when the current limiting module 156 takes control, the delay will be much longer.

The above description of FIG. 4 is for an input voltage limit. For an input current limit, the up/down counter will count down until the input current goes below its set point. The up/down counter stops counting down as soon as this occurs, and there is no additional count down.

Figure 5:
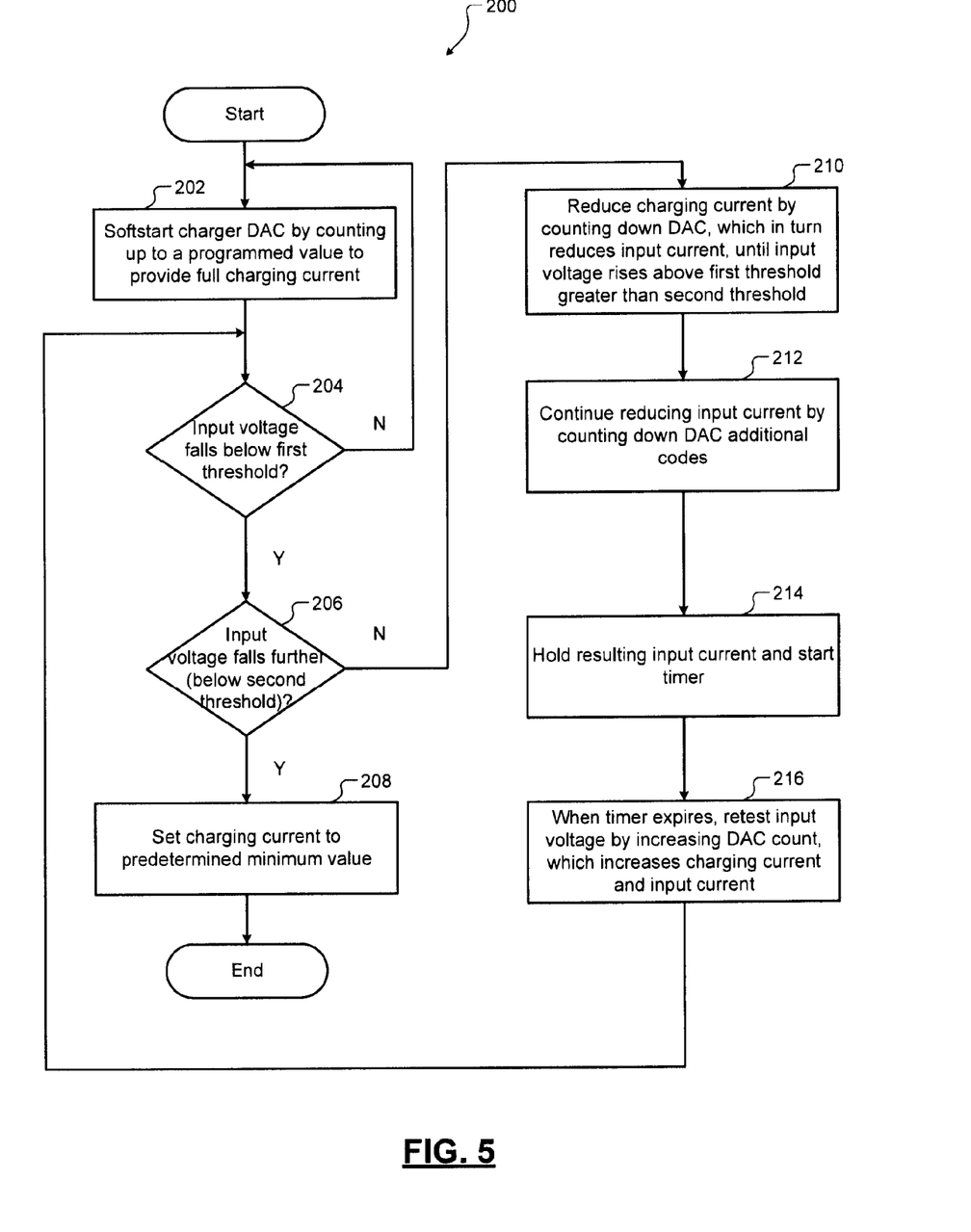
FIG. 5 is a flowchart of a method for limiting the input current drawn from the power supply by the charging module.

Referring now to FIG. 5, a method 200 for adaptive input current limiting according to the present disclosure is shown. At 202, control softstarts a DAC by counting up to a programmed value to provide full charging current. At 204, control determines if the input voltage falls below a first threshold. Control continues to provide the charging current if the input voltage does not fall below the first threshold. At 206, if the input voltage falls below the first threshold, control determines if the input voltage further falls below a second threshold, where the second threshold is less than the first threshold. At 208, if the input voltage falls below the second threshold, control sets the charging current to a predetermined minimum value.

At 210, if the input voltage falls below the first threshold but not below the second threshold, control reduces the charging current by counting down input to the DAC, which in turn reduces the input current, until the input voltage rises above the first threshold greater than the second threshold. At 212, control continues to reduce input current further by counting down input to the DAC an additional number of codes. At 214, control holds the resulting input current and starts the timer. At 216, when the timer expires, control retests the input voltage by increasing the DAC count, which increases the charging current and the input current. Control returns to 204.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:
1. A system comprising:
a voltage regulator module that regulates an input voltage supplied by a power supply and that supplies an output current to a load;

a voltage comparator module that compares the input voltage to a first threshold; and a current limiting module that decreases the output current when the input voltage decreases to less than or equal to the first threshold, that decreases the output current until the input voltage increases to greater than the first threshold, and that decreases the output current further by an additional predetermined amount after the input voltage increases to greater than the first threshold.

2. The system of claim 1 wherein the power supply is a direct current (DC) power supply, the input voltage is DC voltage generated by the DC power supply, the load is a battery, the output current is a charging current of the battery, and the voltage regulator is a Buck regulator.

3. The system of claim 1 wherein the current limiting module decreases the output current to a predetermined value when the input voltage decreases to less than or equal to a second threshold, wherein the second threshold is less than the first threshold.

4. The system of claim 1 wherein the current limiting module comprises:

a counter that generates a first output based on the input voltage and the output current; and a digital to analog converter (DAC) that converts the first output and that generates a second output, wherein the voltage regulator module supplies the output current to the load based on the second output.

5. The system of claim 4 further comprising:

a current sensing module that senses an input current drawn from the power supply by the voltage regulator module, wherein the counter counts up when the output current supplied to the load is less than a predetermined value, the input voltage is greater than the first threshold, and the input current is less than a predetermined threshold.

6. The system of claim 4 further comprising:

a current sensing module that senses an input current drawn from the power supply by the voltage regulator module, wherein the counter counts down when the input voltage is less than or equal to the first threshold and greater than a second threshold that is less than the first threshold or when the input current is greater than or equal to a predetermined threshold.

7. The system of claim 6 wherein the counter counts down a plurality of counts when the input voltage is less than or equal to the first threshold and greater than the second threshold, and wherein the counter counts down a single additional count when the input current becomes greater than or equal to the predetermined threshold.

8. The system of claim 6 further comprising:

a timer that starts when the counter stops counting down, wherein the current limiting module determines, after the timer expires, if the input voltage is less than or equal to the first threshold or if the input current is greater than or equal to the predetermined threshold.

9. The system of claim 4 wherein the counter counts down at a faster rate than the counter counts up.

10. A system comprising:

a voltage regulator module that regulates an input voltage supplied by a power supply and that supplies an output current to a load;

a current sensing module that senses an input current drawn from the power supply by the voltage regulator module;

a current limiting module that decreases the output current when the input current increases to greater than or equal to a predetermined threshold and that decreases the output current until the input current decreases to less than the predetermined threshold;

a counter that generates a first output based on the input voltage, the input current, and the output current; and a digital to analog converter (DAC) that converts the first output and that generates a second output, wherein the voltage regulator module supplies the output current to the load based on the second output, wherein the counter counts up when the output current supplied to the load is less than a predetermined value, the input voltage is greater than a first threshold, and the input current is less than the predetermined threshold; and wherein the counter counts down when the input voltage is less than or equal to the first threshold and greater than a second threshold that is greater than zero and less than the first threshold, or when the input current is greater than or equal to the predetermined threshold.

11. The system of claim 10 wherein the power supply is a direct current (DC) power supply, the input voltage is DC voltage generated by the DC power supply, the load is a battery, the output current is a charging current of the battery, and the voltage regulator is a Buck regulator.

12. The system of claim 10 wherein the counter counts down a plurality of counts when the input voltage is less than or equal to the first threshold and greater than the second threshold, and wherein the counter counts down a single additional count when the input current becomes greater than or equal to the predetermined threshold.

13. The system of claim 10 further comprising:

a timer that starts when the counter stops counting down, wherein the current limiting module determines, after the timer expires, if the input voltage is less than or equal to the first threshold or if the input current is greater than or equal to the predetermined threshold.

14. The system of claim 10 wherein:

the current limiting module decreases the output current to a predetermined value when the input voltage decreases to less than or equal to the second threshold.

15. The system of claim 10 wherein the counter counts down at a faster rate than the counter counts up.

16. A method comprising:

supplying an input voltage from a power supply to a voltage regulator;

supplying an output current from the voltage regulator to a load;

sensing an input current drawn from the power supply;

decreasing the output current when the input current is greater than or equal to a first predetermined value until the input current decreases to less than the first predetermined value; and decreasing the output current by a first amount when the input voltage is less than or equal to a first threshold until the input voltage increases to greater than the first threshold and by a second amount after the input voltage is greater than the first threshold.

17. The method of claim 16 further comprising decreasing the output current to a second predetermined value when the input voltage is less than or equal to a second threshold that is less than the first threshold.

* * * * *

UNITED STATES PATENT AND TRADEMARK OFFICE
CERTIFICATE OF CORRECTION

PATENT NO. : 9,166,442 B1  
APPLICATION NO. : 13/621447  
DATED : October 20, 2015  
INVENTOR(S) : Mark Anthony Belch et al.

Page 1 of 1

It is certified that error appears in the above-identified patent and that said Letters Patent is hereby corrected as shown below:

In the Specification:

Column 4, Line 19        Delete "102," and insert --106,--

Column 5, Line 51        Delete "MINI" and insert --MIN_I--

Column 7, Line 7         Delete "VBAT" and insert --VBATT--

Signed and Sealed this  
Sixteenth Day of February, 2016

Michelle K. Lee  
*Director of the United States Patent and Trademark Office*